July 12, 1949.　　　　　　P. C. ANDERSON　　　　　　2,475,686
DEVICE FOR APPLYING LIQUID FERTILIZER
Filed Dec. 29, 1947　　　　　　　　　　　　　2 Sheets-Sheet 1

Inventor
Philip C. Anderson
By Clarence A. O'Brien
and Harvey B. Jacobson
Attorneys July 12, 1949.　　　　　P. C. ANDERSON　　　　　2,475,686
DEVICE FOR APPLYING LIQUID FERTILIZER
Filed Dec. 29, 1947　　　　　　　　　　　　　　　　2 Sheets-Sheet 2
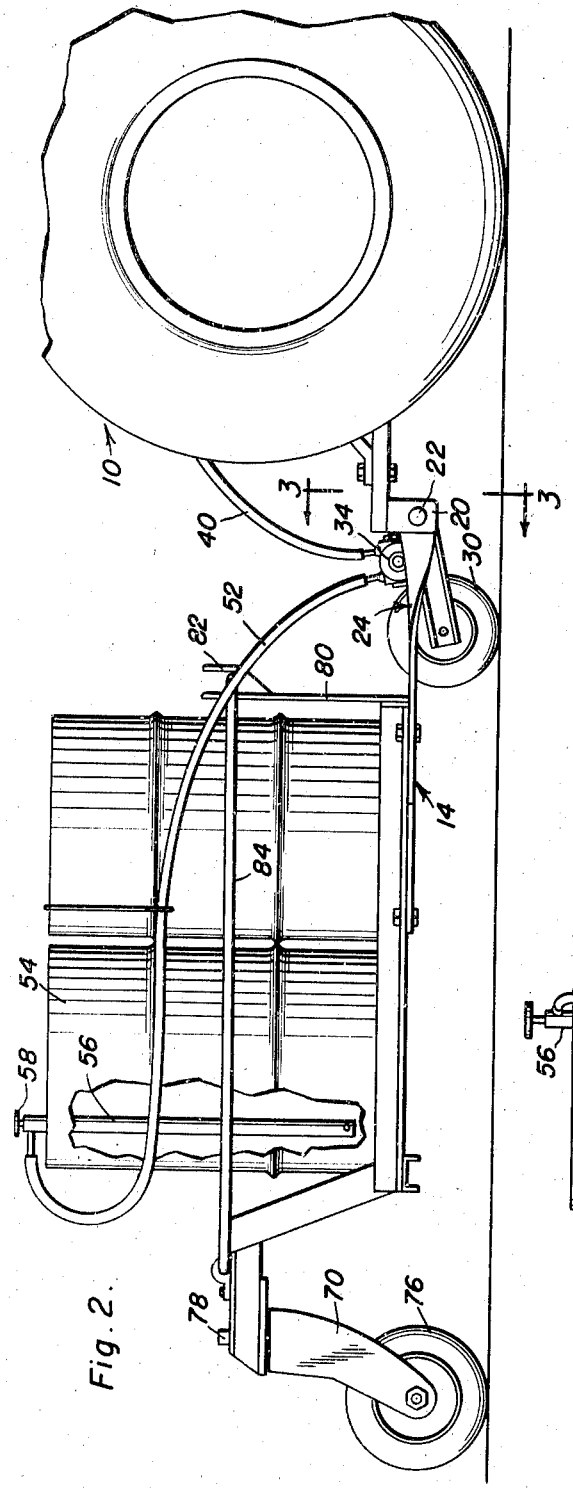
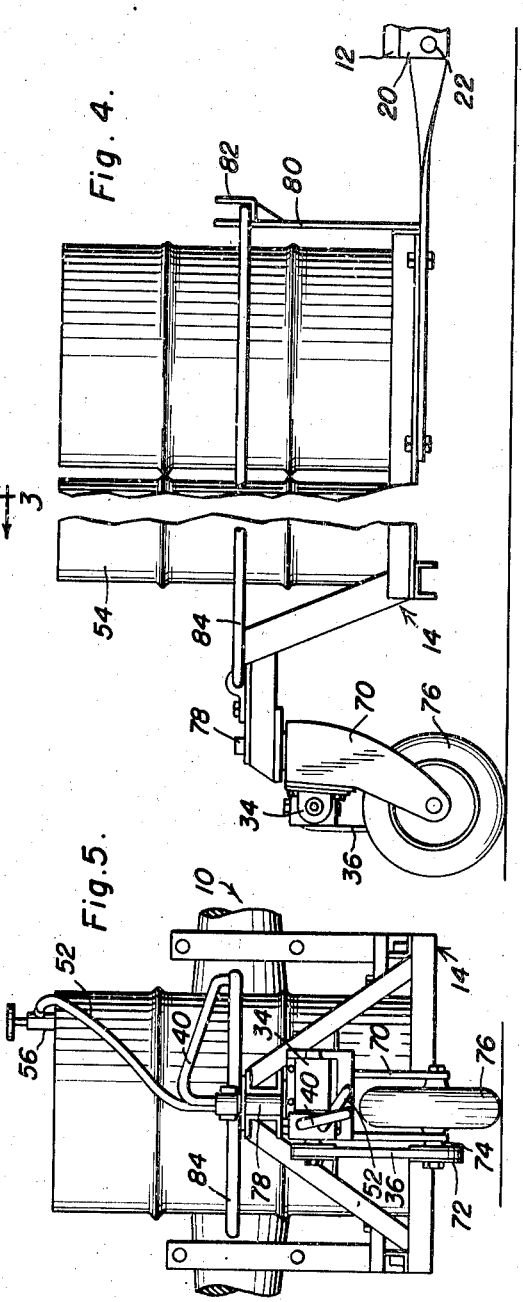
Philip C. Anderson
INVENTOR.

Patented July 12, 1949

2,475,686

UNITED STATES PATENT OFFICE 2,475,686

DEVICE FOR APPLYING LIQUID
FERTILIZER

Philip C. Anderson, Crete, Nebr.

Application December 29, 1947, Serial No. 794,376

2 Claims. (Cl. 222—177)

This invention relates to subject matter similar to that in my co-pending application, Serial No. 734,349, filed March 13, 1947, and entitled "Device for applying liquid fertilizer."

An object of this invention is to structurally improve the device illustrated in my co-pending application by the addition of a priming pump, for priming the system of conduits and the wheel driven pump, by the introduction of a hollow shaft for use in conjunction with the caster, whereby a conduit may extend therethrough, thereby obviating undesired twist about the caster assembly by mounting the pump (wheel driven) on the wheel assembly for movement therewith and to supply a device which has a field of utility in various environments.

Ancillary objects and features of novelty will become apparent to those skilled in the art, in following the description of the preferred forms of the invention illustrated and described herewith, wherein in the accompanying drawings.

Figure 1:
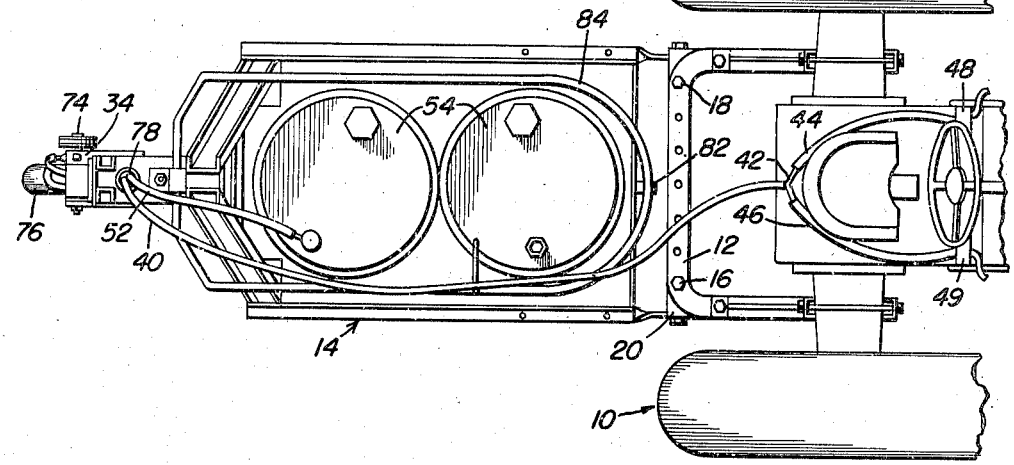
Figure 1 is a plan view of the invention.
Figure 2:
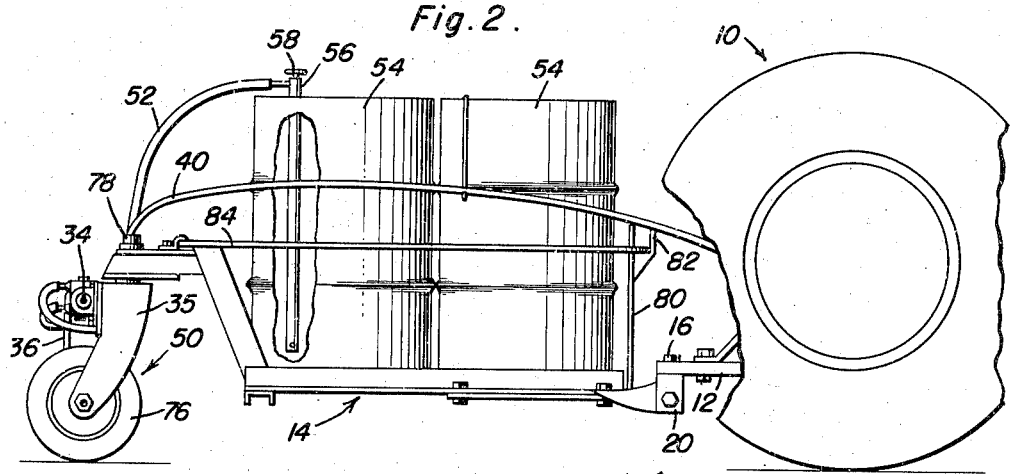
Figure 2 is an elevational side view of the device illustrated in Figure 1.

This invention relates to similar subject matter of my co-pending application identified above. The common subject matter is readily ascertainable as the frame, portions of the tractor, storage barrels on the frame, caster construction as well as control means for the system of fluid flow.

In applying liquid fertilizer, a tractor conventional in nature, is supplied and generally indicated at 10. The usual drawbar 12 is associated therewith and is connected to the tractor by conventional means.

A frame generally indicated at 14 is provided of metallic construction and various cross members and braces are supplied in accordance with the dictates of sound engineering principles. This frame attaches to the conventional drawbar 12 through the medium of a pair of bolts 16 and 18 respectively, by passing them through the said drawbar 12 and through an end member 20 forming a portion of the said frame 14.

A conduit 40 extends from a pump 34 being intercommunicated therewith, and terminates in a manifold 42. This manifold has a plurality of conduits 44 and 46 extending therefrom which terminate in valve control boxes 48 and 49 respectively, as described in my co-pending application. Suitable tubes extend from the valve boxes to a point of discharge.

A conduit 52 is also intercommunicated with the said pump 34 and terminates adjacent a storage tank 54. It will be noted that room is supplied to accommodate two tanks. However, it is apparent that any number of such tanks may be supplied.

A manually operative priming pump 56 is adapted to project within one the tanks 54 and a suitable handle 58 extends from the priming pump 56 for actuation purposes.

Seated in the said pump 56 is a check valve which is rendered operative when the manually operated pump is utilized for the purpose of priming the said pump 34 and the conduits associated and connected therewith.

The said pump 34 is secured to a caster yoke 35 and the belt 36 extends from the said pump to a drive pulley 72 which is in turn attached to the axle 74. The said axle 74 has a wheel 76 rigidly attached thereto, which wheel cooperates with the yoke 35 to form a part of the caster assembly generally indicated at 50.

Figures 3, 4:
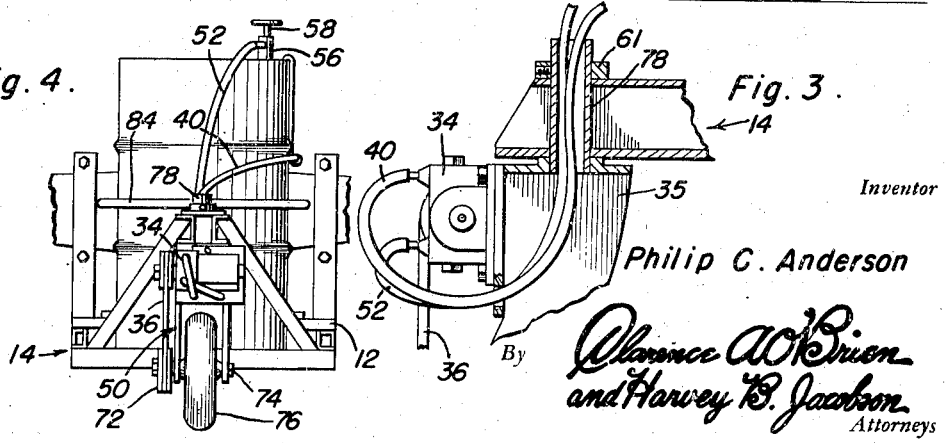
Figure 3 is a fragmentary sectional side view illustrating a part of the caster assembly with tubes passed therethrough.
Figure 4 is a rear view of the construction illustrated in Figure 1.

The caster swivel pin 78 is of hollow construction, in order to accommodate the tubes or conduits 40 and 52 which extend therethrough. By this medium, the tubes are prevented from winding around the caster assembly in operation of the device and particularly when there is swivel movement of the caster assembly. To hold the caster assembly in place on the frame, a collar 61 having a set screw therein may be used as shown in Figure 4; or, any conventional fastening arrangement may be substituted.

In supporting the tanks 54 it will be noted that a support or stand 80 is attached to the frame 14 and has a bifurcated terminal portion 82. An oval-shaped bracket 84 is pivoted to the frame 14 adjacent the caster assembly and seats in the bifurcations 82 in retaining the storage tanks 54 in the operative position.

While there has been described and illustrated but preferred forms of the invention, it is apparent that variations may be made without departing from the spirit thereof.

Having described the invention what is claimed as new is:

1. In a crop sprayer, a vehicle which includes a frame partially supported by a swivel wheel assembly, said swivel wheel assembly being rotatable about and including a substantially vertical hollow shaft, a tank disposed on said frame, a pump mounted on said swivel assembly and driven by the swivel wheel thereof, one fluid conducting tube disposed between said tank and said pump for conducting fluid from the tank to the pump, a second fluid conducting tube disposed between said pump and a point of discharge, said tubes being passed through said hollow shaft to minimize entanglement of the tubes when said swivel assembly is rotated.

2. A spray apparatus comprising a vehicle frame partially supported by a rear swivel wheel assembly which includes a yoke, a rotatable wheel carried by said yoke, and a hollow shaft fixed to said yoke and rotatively secured to said frame in a substantially vertical position, a spray fluid supply tank carried by said frame, a pump fixed to said yoke, means secured to said pump and said wheel for operating said pump, said means being driven by said wheel, a fluid flow circuit connecting said tank and said pump and which terminates at a point of discharge, said circuit including fluid conductors and at least one of said conductors being passed through said hollow shaft to minimize entaglement of the conductors when said swivel assembly is rotated.

PHILIP C. ANDERSON.

REFERENCES CITED

The following references are of record in the file of this patent:

UNITED STATES PATENTS

| Number | Name | Date |
| --- | --- | --- |
| 510,287 | Peppler | Dec. 5, 1893 |
| 974,764 | Ganey | Nov. 1, 1910 |
| 1,747,793 | Pounds et al. | Feb. 18, 1930 |
| 1,980,015 | Thompson | Nov. 6, 1934 |
| 2,199,966 | Timm | May 7, 1940 |
| 2,246,866 | Stribling et al. | June 24, 1941 |
| 2,381,649 | Dalton | Aug. 7, 1945 |

FOREIGN PATENTS

| Number | Country | Date |
| --- | --- | --- |
| 11,213 | Netherlands | June 16, 1924 |
| 12,949 | Germany | 1880 |